(12) United States Patent
Messenger et al.

(10) Patent No.: US 10,967,799 B2
(45) Date of Patent: Apr. 6, 2021

(54) COMBINED APPROACH LAMP AND LOGO LAMP

(71) Applicant: MOTHERSON INNOVATIONS COMPANY LIMITED, London (GB)

(72) Inventors: Jacob Heath Messenger, Lonsdale (AU); Sam Thoday, Lonsdale (AU); Simon Belcher, Lonsdale (AU); Arne Schmierer, Stuttgart (DE); Volker Erhart, Stuttgart (DE); Tobias Schwenger, Stuttgart (DE); Mikhail Kudryavtsev, Stuttgart (DE); Levente Acs, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 16/606,074

(22) PCT Filed: Apr. 18, 2018

(86) PCT No.: PCT/EP2018/059959
§ 371 (c)(1),
(2) Date: Oct. 17, 2019

(87) PCT Pub. No.: WO2018/193000
PCT Pub. Date: Oct. 25, 2018

(65) Prior Publication Data
US 2020/0290516 A1   Sep. 17, 2020

(30) Foreign Application Priority Data

Apr. 20, 2017   (AU) ................................ 2017901442
Dec. 15, 2017   (DE) ........................ 10 2017 130 246

(51) Int. Cl.
*F21V 5/00*       (2018.01)
*B60R 1/12*       (2006.01)
(Continued)

(52) U.S. Cl.
CPC .............. *B60R 1/1207* (2013.01); *B60Q 1/24* (2013.01); *B60Q 1/2665* (2013.01); *B60R 1/06* (2013.01);
(Continued)

(58) Field of Classification Search
CPC ..... B60R 1/1207; B60R 1/06; B60R 16/0231; B60Q 1/2665; B60Q 1/24; B60Q 2400/40;
(Continued)

(56) References Cited

U.S. PATENT DOCUMENTS 9,056,584 B2 *   6/2015  Fish, Jr. .................. G02F 1/157
2010/0053986 A1   3/2010  Ishikawa
(Continued)

FOREIGN PATENT DOCUMENTS

JP   2009/107601 A1   5/2009
WO  WO 2016/012651 A1  1/2016
WO  WO 2016/117254 A1  7/2016

OTHER PUBLICATIONS

International Search Report dated Jun. 15, 2018 of International application No. PCT/EP2018/059959.
(Continued)

*Primary Examiner* — Ali Alavi
(74) *Attorney, Agent, or Firm* — Jones Day

(57) ABSTRACT

A combined approach lamp and logo lamp apparatus for use in an external rear view assembly comprising at least one aperture, the apparatus including a housing including a rear view face and a front face with the at least one aperture; a printed circuit board (PCB) mounted adjacent the rear face, the printed circuit board further including a power connector, an electronic circuit, a first light source mounted in a first location on the printed circuit board, and a second light source mounted in a second location on the printed circuit
(Continued)

board, and a transparent lens component comprising a first lens portion and a second lens portion.

19 Claims, 9 Drawing Sheets

(51) Int. Cl.
| | |
|---|---|
| *F21S 41/20* | (2018.01) |
| *F21S 43/20* | (2018.01) |
| *B60Q 1/24* | (2006.01) |
| *B60Q 1/26* | (2006.01) |
| *B60R 1/06* | (2006.01) |
| *B60R 16/023* | (2006.01) |
| *F21W 103/60* | (2018.01) |
| *F21W 102/40* | (2018.01) |

(52) U.S. Cl.
CPC ........ *B60R 16/0231* (2013.01); *F21S 41/285* (2018.01); *F21S 43/26* (2018.01); *B60Q 2400/40* (2013.01); *F21W 2102/40* (2018.01); *F21W 2103/60* (2018.01)

(58) Field of Classification Search
CPC .... F21S 41/285; F21S 43/26; F21W 2103/60; F21W 2102/40
USPC .......................................................... 362/521
See application file for complete search history.

(56) References Cited

U.S. PATENT DOCUMENTS

| | | | |
|---|---|---|---|
| 2011/0157907 A1* | 6/2011 | Hwang ................. | B60R 1/1207 362/494 |
| 2011/0170307 A1* | 7/2011 | Ishikawa .............. | B60Q 1/2665 362/516 |
| 2015/0224919 A1 | 8/2015 | Sobecki et al. | |
| 2017/0210282 A1* | 7/2017 | Rodriguez Barros . | B60Q 1/484 |
| 2019/0270403 A1* | 9/2019 | Sobecki ............... | G03B 21/001 |

OTHER PUBLICATIONS

Written Opinion dated Jun. 15, 2018 of International application No. PCT/EP2018/059959.

* cited by examiner

COMBINED APPROACH LAMP AND LOGO LAMP

CROSS-REFERENCE TO RELATED APPLICATIONS

This application is a National Stage Entry of PCT/EP2018/059959, filed Apr. 18, 2018, which claims the benefit of foreign priority to Australian Patent Application No. 2017901442, filed Apr. 20, 2017, and claims the benefit of foreign priority to German Patent Application No. DE 10 2017 130 246.8, filed Dec. 15, 2017, each of which is hereby incorporated by reference in its entirety for all purposes.

BACKGROUND

1. Field of the Invention

The present disclosure relates to approach lamps in external rear view lighting arrangements. In particular, the present disclosure refers to a combined approach lamp and logo lamp apparatus for use in an external rear view assembly, an external rear view assembly with such an apparatus and a vehicle with such an external rear view assembly.

2. Related Art

An external rear view assembly for a motor vehicle includes at least one reflective element such as a mirror, and/or a camera in cooperation with a display, with the display being arranged within the external rear view assembly attached at a side of the motor vehicle or within the motor vehicle. A conventional rear view side mirror or a camera pod are examples of rear view assemblies.

A rear view assembly for a motor vehicle offers a view of the area behind the motor vehicle at least in compliance with the legal provisions and belongs to a sub-group of assemblies for an indirect view. These provide images and views of objects which are not in the driver's direct field of view, i.e., in directions opposite of, to the left of, to the right of, below and/or above the driver's viewing direction. The driver's view cannot be fully satisfactory, in particular also in the viewing direction; the view can, for example, be obstructed by parts of the driver's own vehicle, such as parts of the vehicle body, in particular, the A-pillar, the roof construction and/or the bonnet and the view may be obstructed by other vehicles and/or objects outside the vehicle that can obstruct the view to such an extent that the driver is not able to grasp a driving situation to his/her full satisfaction or only incompletely. It is also possible that the driver is not able to grasp the situation in or outside of his/her viewing direction in the way required to control the vehicle according to the situation. Therefore, a rear view assembly can also be designed in such a way that it processes the information according to the driver's abilities in order to enable him/her to grasp the situation in the best possible manner.

Different functions and devices can be built into rear view assemblies and/or controlled with the help of rear view assemblies wherein cameras are included as well. The functions and devices for improving, enhancing, and/or maintaining the functionality of the rear view assembly under normal or extreme conditions are particularly useful. They can include heating or cooling systems, cleaning materials such as wipers, liquid and/or gaseous sprays, actuator means for moving the rear view assembly and parts thereof such as a display, a camera system and/or parts of a camera system, for example, comprising lenses, filters, light sources, adaptive optics such as formable mirrors and/or actuator means for the induction of movements of other objects, for instance, parts of the vehicle and/or objects surrounding the vehicle.

Moreover, the rear view assembly can include linear guiding devices and/or rotating wheels, such as a filter wheel, for exchanging optical elements, for example, comprising lenses, mirrors, light sources, sensors, adaptive optics such as formable mirrors and/or filters.

Further devices can be integrated in rear view assemblies and/or further devices can be controlled by means of rear view assemblies, such as any kind of light module comprising an external light module, an internal light module, a front light, a rear light, fog lights, a brake light, an accelerator light, a blinking light, a logo light, an apron lighting, a ground light, a puddle light, a flash light, a navigation light, a position light, an emergency light, headlights, a green light, a red light, a warning light, a blinking light module, an approach light, a search light, an information light, an indicator and/or the like. Further examples for functions and devices which can be integrated in or controlled by rear view assemblies can be a fatigue detection system, a system to detect momentary nodding off, a distance and/or speed determination system, for example, a LIDAR (light detection and ranging) system, a blind angle indication system, a lane-change assistance system, a navigation assistance system, a tracking assistance system, a man-machine interaction system, a machine-machine interaction system, an assistance system for emergency and precautionary measures, such as an accident prevention assistance system, a countermeasure assistance system, a braking assistance system, a steering assistance system, an accelerator assistance system, an escape assistance system which, for example, includes a catapult seat system, a direction indicator, a blind angle indicator, an approach system, an emergency brake system, a charging status indicator, a vehicle mode system, for instance, comprising a sports-mode system, an economy-mode system, an autonomous driving-mode system, a sleep mode system and/or an anti-theft system, a vehicle-locked indication system, a vehicle-stolen indicator, a warning signal system, a temperature indicator system, a weather indication system, a traffic light signal system, a fuel status system and/or any combination thereof.

Lighting devices for rear view assemblies and/or associated fibre-optic light guides are described in the German patent application No. 102012108488, in the German patent application No. 102012104529, in the German patent application No. 102012107833, in the German patent application No. 102012107834, in European patent No. 2738043, in European patent No. 2947378, in the international patent application No. 2015/173695, in the European patent application No. 3045944, in the U.S. patent application Ser. No. 15/228,566, in the U.S. patent application Ser. No. 15/000,733, in the international patent application No. 2016/147154, in the U.S. patent application Ser. No. 15/256,532, in the German patent application No. 102015115555, in the European patent application No. 3144183, of the applicant.

A camera module can in particular includes a multitude of different optical elements, inter alia, comprising a multitude of different sensors and light sources as well as housing parts. The housing of a camera module can be made of plastic, metal, glass, another suitable material and/or any combination thereof and can be used in combination with the techniques for changing or modifying the properties of the material or the material surface. Housings are, for example, disclosed in the German patent application No. 102016108247.3.

The camera can, for example, includes CCD or CMOS or light field sensors as they are, for example, described in the German patent application No. 102011053999 and in U.S. Pat. No. 6,703,925. A certain sector of the sensor can also be reserved for different purposes, for instance, for detecting a test beam, as disclosed in U.S. Pat. No. 8,031,224.

The optical elements can be formed or designed from any type of glass or any other suitable material. Here, glass is used in the sense of a non-crystalline amorphous solid body showing a glass transition when being heated towards the liquid state. It includes, for example, the group of polymer glasses, metal glasses, silicon oxide glasses, but also any other suitable material can be used that shows the glass transition. The glass can be either plane, wedge-shaped, rectangular, cylindrical, spherical, conical, elliptical, and/or circular, as it is, for example, described in the German patent application No. 102016108247.3 and the German patent application No. 102011103200, or may be formed according to the different requirements or lens types. As non-limiting examples, camera modules can be equipped with lenses such as wide-angle or fisheye lenses, which are suited to provide peripheral pictures, as described in the U.S. patent application Ser. No. 15/281,780 and the U.S. patent application Ser. No. 13/090,127, a Fresnel lens or micro lenses, as described in the German patent application No. 102011053999, or a TIR (total intern reflection) lens, as described in U.S. Pat. No. 8,740,427. Another type of optical elements which are notoriously used in camera modules, are optical fibres, in particular, in the form of fibre bundles and preferably in the form of fibre bundles with an optical head, such as described in the U.S. patent application Ser. No. 09/771,140. Different processes can be applied in order to manufacture such optical elements, such as the process described in U.S. Pat. No. 8,460,060. The optical elements can be transparent as, for instance, in U.S. Pat. No. 8,031,224, in the German patent application No. 102016108247.3 and in the U.S. patent application Ser. No. 13/242,829. However, the optical elements can be semi-transparent as well, as described in the U.S. patent application Ser. No. 09/771,140 and the U.S. patent application Ser. No. 13/090,127. Furthermore, the optical elements can be completely or partly coated with different types of coatings in order to achieve different effects, such as anti-reflection coatings, see U.S. Pat. No. 8,031,224, reflection coatings on a chrome basis, see U.S. Pat. No. 9,181,616, and other coatings, for example, for polymeric substrates as described in the U.S. patent application Ser. No. 14/936,024 and in the U.S. patent application Ser. No. 15/124,310. The optical elements preferably consist of a scratch-proof material, as, for example, described in the German patent application No. 102016108247.3. In certain spots of the optical elements, the optical elements can have decoupling structures, and an optical film, an extrusion film for example, and a formed coating can be applied, as described in the German patent application No. 102011103200. A coating for spectral and tension control is described in the U.S. patent application Ser. No. 15/124,310. Different filters can be integrated in the optical elements, such as grey filters or polarisation filters, which are described in the U.S. patent application Ser. No. 14/809,509. Electrochromic substrates, polymer electrolytes, and other charge-conductive media can be included for the optical elements on the basis of the descriptions, as disclosed in the European patent application No. 08103179.1, the European patent No. 2202826, the U.S. Pat. No. 7,999,992, and the U.S. Pat. No. 8,537,451.

The camera module can also be equipped with devices for controlling the light intensity, as described, for example, in the U.S. patent application Ser. No. 14/809,509 and include light level amplifier tubes, as described in the U.S. patent application Ser. No. 09/771,140. The electrochromic substrates and apparatuses used in the European patent application No. 08103179.1, the European patent No 2202826, the U.S. Pat. No. 7,999,992, and the U.S. Pat. No. 8,537,451 can also be used for this purpose just like a transflector for transmitting or reflecting light on the basis of a respective input signal, as described in the German patent application No. 102016106126.3.

The camera module or a cover adapted to the camera module can be moved by different actuators, drive units, and/or a flexible track, as described, for instance, in the German patent application No. 102016108247.3 and the U.S. patent application Ser. No. 15/281,780. Moreover, the camera module can also include cleaning elements in order to clean the outward pointing optical element exposed to the environment. The cleaning element can, for example, contain wipers, brushes, lips, nozzles, ventilators, and similar elements, as they are described in the European patent application No. 14165197.6, the U.S. patent application Ser. No. 15/281,780, the German patent application No. 102016108247.3, the European patent application No. 13163677.1, the European patent application No. 15173201.3, and European patent No. 1673260. The cleaning devices are not limited as to their composition and can, for example, include any kind of tissues, elastomers, sponges, brushes, or combinations thereof. Special wiper elements that include wiper arms, wiper blades, wiping cloths, wiping tissues, and combinations thereof are described in the European patent application No. 14165197.6. A wiping element can, for example, be controlled according to the process described in the European patent application No. 130164250.6. A reservoir for keeping a cleaning liquid, as described in the European patent application No. 14165197.6, can be fixed to or integrated in the camera module in order to supply the optical elements of the camera module with the cleaning liquid.

Different processes can be used in order to detect dirt or other blurs which impede or impair the functioning of the camera module, as described in the U.S. Pat. No. 8,395,514, the European patent No. 1328141, and the U.S. Pat. No. 8,031,224. In addition, light sources can be built or integrated in the camera module in order to increase the visibility of surrounding objects, to measure distances and directions, and to detect dirt, as described in the U.S. Pat. No. 8,031,224, the U.S. patent application Ser. No. 62/470,658, and the U.S. patent application Ser. No. 09/771,140.

It is known to provide such cameras with heating devices and/or protection glasses. For this purpose, heating foils are, for instance, glued onto or laminated with the protection glass. The manufacturing of such a solution is costly and, due to the low thermal mass of such a heating foil, it has only a low heating capacity. Different heating means, such as heating coils, heating devices integrated in the lens mounting or lining or other heating elements can be used in order to prevent condensation and icing on the surface of optical elements, such as described in the German patent application No. 102016108247.3 and the U.S. patent application Ser. No. 62/470,658.

Waterproof seals against weather conditions as well as against the influence of washing processes with cleaning agents, solvents, and high-pressure cleaners can be used for the housing of the camera module, as described, for example, in the U.S. patent application Ser. No. 13/090,127. Alternatively, the housing can be made in one piece, which consists of plastic and a conductive material, the conductive material being spread in the plastic material in order to form a conductive mass, enabling a power source, preferably a DC voltage source, to be connected with the body via at least two electrodes and to warm up the body accordingly. A conductive track can be embedded in the plastic parts of the camera module, as described in the European patent No. 1328141 and the U.S. Pat. No. 7,083,311.

The camera module can include an energy collection system, as, for example, described in the European patent application Ser. No. 09171683.7. An error detection system for electric loads, as it is described in the U.S. Pat. No. 8,487,633, can be used in order to detect a failure of the camera module.

Different types of fixings can be used in order to attach the camera module to the vehicle or to other components, such as the snap-in connection described in European patent No. 2233360.

Different controlling means and analysis devices can be used, for example, the calculation units described in the U.S. patent application Ser. No. 13/090,127, the German patent application No. 102016106126.3, the German patent application No. 102011053999, the European patent application No. 2146325, and the U.S. Pat. No. 8,849,104. In addition, the HDR (high dynamic range) technology according to the U.S. patent application Ser. No. 14/830,40 can be used.

Additional functional elements and/or decorative elements, such as logo projectors, are thus increasingly integrated in rear view assemblies of vehicles. By means of such a logo projector, a symbol, for example the manufacturer's logo, can be projected onto the road. For this purpose, the logo projector includes a light source, a mask, and/or a slide for determining the logo as well as a projection lens. In order to make sure that the logo can be projected onto the road without any distortions, the position of the logo projector must be exactly defined. However, since, apart from the internal tolerance of the logo projector, i.e., the relative position between the mask and the lens, there are usually further tolerances, for example between the logo projector and the mirror housing, between the mirror head and the mirror foot, as well as between the mirror foot and the vehicle body, the position of the logo projector is not always exactly defined. This may result in undesired angular deviations and/or distortions of the projected logo.

Some rear view side mirrors incorporate approach lamps (also known as puddle lamps) within the side mirror housing which are used to project light downward onto the ground adjacent a vehicle. Standard (or basic) approach lamps have a light source such as an LED that is directed through an aperture in the lower surface of the side mirror. The light source is held at a desired fixed distance from the aperture and may use simple optical arrangements such as a light pipe to direct light through the aperture. More recently more sophisticated projector based approach lamps have been developed that use a lens arrangement incorporating a filter, mask, or screen (or similar) to project a logo, image symbol, message, or the like (referred to as logo in the following) through the aperture. These will be referred to as logo lamps with logo elements to distinguish them from standard approach lamps. Projection of the logo requires the use more complicated optical arrangements compared with standard approach lamps, and thus such projector approach lamps are typically physically larger and more expensive than standard approach lamps.

Still further, some mirrors incorporate both standard approach lamps and logo lamps. For example a standard approach lamp can be used to provide broad illumination for low speed maneuvering, whilst a logo lamp can be used to project a defined logo on the ground when stationery (eg when approaching or leaving the vehicle). One problem with providing both standard approach lamps and logo lamps is that the available space within a rear view side mirror for an approach lamp is typically quite limited, and the approach lamp modules must fit around or in spaces between the side mirror components such as mirrors and motors which creates design challenges. Further vehicles are requiring larger and larger illumination angles from approach lamps to both please the end user and allow camera systems to see around the car, which creates further design challenges in creating combined approach and logo lamp modules.

There is thus a need to provide combined approach lamp and logo lamp modules and systems for mounting in rear view assemblies, or at least to provide a useful alternative to existing solutions. Further there is the need to project a logo onto a road with particularly low distortion.

SUMMARY

According to a first aspect, there is provided a combined approach lamp and logo lamp apparatus for use in an external rear view assembly comprising at least one aperture, the apparatus comprising: a housing comprising a rear face and a front face with the at least one aperture; a printed circuit board (PCB) mounted adjacent the rear face, the printed circuit board further comprising a power connector, an electronic circuit, a first light source mounted in a first location on the printed circuit board and a second light source mounted in a second location on the printed circuit board; and a transparent lens component comprising a first lens portion and a second lens portion, wherein the housing and the lens component are formed, preferably as a two component moulded part, such that the first lens portion is orientated to focus light from the first light source and the second lens portion is orientated to focus light from the second light source via an optical assembly comprising a logo element, and the first lens portion is angled relative to a plane containing the PCB surface so that the distance from the first light source to an outer surface of the first lens portion is less than the distance from the second light source to an outer surface of the second lens portion, with, in use, the housing being mounted so that the first lens portion and the second lens portion are adjacent the at least one aperture in the side mirror housing.

The at least one aperture may include a first aperture and a second aperture separated by an opaque bridging portion; the first lens portion is located in the first aperture and the second lens portion is located in the second aperture; and the second lens portion is separated from the first lens portion by an joining portion, with the joining portion preferably being covered by the opaque bridging portion.

It is preferred that the PCB has an area of at least 750 mm$^2$, preferably at least 900 mm$^2$, more preferably at least 1100 mm$^2$.

The electronic circuit can be configured to separately control the output of the first light source and the output of the second light source, and the output of each light source is controlled to limit the total output under a predetermined maximum thermal dissipation limit. Both light sources can be actuated at the same time, with preferably a resettable fuse for an overheat control being provided. It is also proposed that the electronic circuit is configured to operate the combined approach lamp and logo lamp apparatus in at least two modes, wherein in each mode the total output remains under a predetermined maximum thermal dissipation limit, and in the first mode both the first light source and the second light source are switched on, and in the second mode only one of the first light source or second light source is switched on, and generates light with an intensity larger than an intensity of the same light source when operated in the first mode.

The first lens portion may be angled with respect to the plane containing the PCB surface, with preferably the first lens portion being angled with respect to the plane containing the PCB surface with an angle in the range of 10° to 25°, more preferably 15° to 20°, and/or the first lens portion is of the light pipe type, preferably multi-faceted.

The second lens portion can be parallel to the plane containing the PCB surface and/or recessed.

The combined approach lamp and logo lamp apparatus can be further characterized in that the first light source is part of an approach lamp; the first lens portion has a first width and is mounted in a first offset position at an offset distance from the outer surface of the lower surface of the side mirror housing; and the approach lamp aperture has a second width which is wider than the first width of the first lens portion, with preferably the approach lamp projecting light both forward and rearward, in particular at a forward angle between 50° and 65° and a rearward angle between 50° and 75°.

The rear surface supports the PCB with the power connector, which preferably includes two prongs which engage with a plug which operatively connects the prongs to cables through a seal.

Further there can be a power connector housing, in particular in a proximal face, provided by the housing, which preferably is opaque and further includes a first side face, a second side face, and a distal face, the proximal face comprising an aperture for receiving at least one cable.

Still further, there can be a mounting flange for mounting the combined approach lamp and logo lamp apparatus to an interior housing of the rear view side mirror through a mirror aperture, with the mounting flange preferably being located on either the first side face or the second side face, and the rear surface engages with the housing to form a rear face and the rear surface; and/or further comprising connection means, in particular for a screw, snap and/or clip connection, for mounting the combined approach lamp and logo lamp apparatus to the external rear view assembly, preferably via a mirror adaptor.

In another aspect, an adjusting device for spatially adjusting the apparatus relative to a housing part of the rear view assembly, in particular relative to a housing cap and/or a foot cover includes at least one first adjusting element being arranged at the apparatus or formed together with an apparatus housing and/or provides at least one translational degree of freedom along at least one shifting axis and/or at least one rotational degree of freedom around at least one rotational axis.

In another aspect, an external rear view assembly includes the combined approach lamp and logo lamp apparatus of the invention. This external rear view assembly can include at least one second adjusting element of the adjusting device that is arranged at or formed together with a holding device for the apparatus and/or the housing part, and/or the adjusting device includes at least one fixing element for fixing the apparatus in a position adjusted by means of the adjusting device, preferably via at least one fixing screw and/or bonding.

BRIEF DESCRIPTION OF DRAWINGS

The foregoing summary, as well as the following detailed description, will be better understood when read in conjunction with the appended drawings. For the purpose of illustration, certain examples of the present disclosure are shown in the drawings. It should be understood, however, that the present disclosure is not limited to the precise arrangements and instrumentalities shown. The accompanying drawings, which are incorporated in and constitute a part of this specification, illustrate an implementation of system, apparatuses, and methods consistent with the present disclosure and, together with the detailed description, serve to explain advantages and principles consistent with the present disclosure, wherein.

DETAILED DESCRIPTION

Figure 1A:
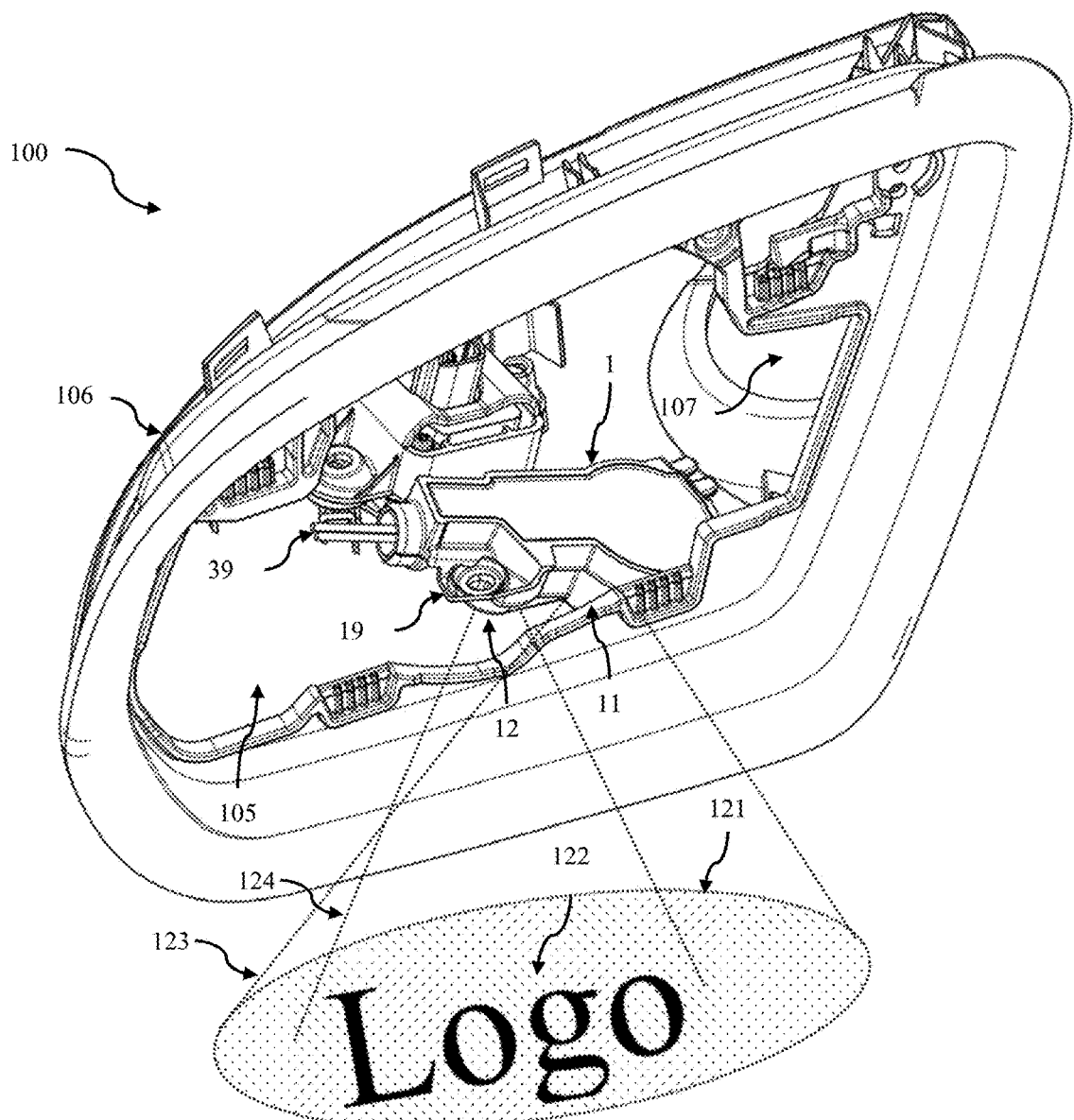
FIG. 1A is a isometric view of the interior of a rear view side mirror including a combined approach lamp and logo lamp according to an embodiment.

Referring now to FIG. 1A, there is shown an isometric view of the interior of an interior housing 106 of an external rear view assembly in form of a rear view side mirror 100 through the mirror aperture 105. The mirror and mirror support and actuators have been omitted from this view to show the location of an embodiment of a combined approach lamp and logo lamp 1 within the interior housing 106. The combined approach lamp and logo lamp 1 includes a mounting plate or flange 19 on one side to mount the combined approach lamp and logo lamp 1 to the interior housing 106. The interior housing 106 further includes a mounting aperture 107 for mounting the mirror to a vehicle, and provides an aperture through which power and command cables 39 can be provided to the approach lamp and logo lamp 1 and other components located within the interior of the side mirror 100.

Figure 1B:
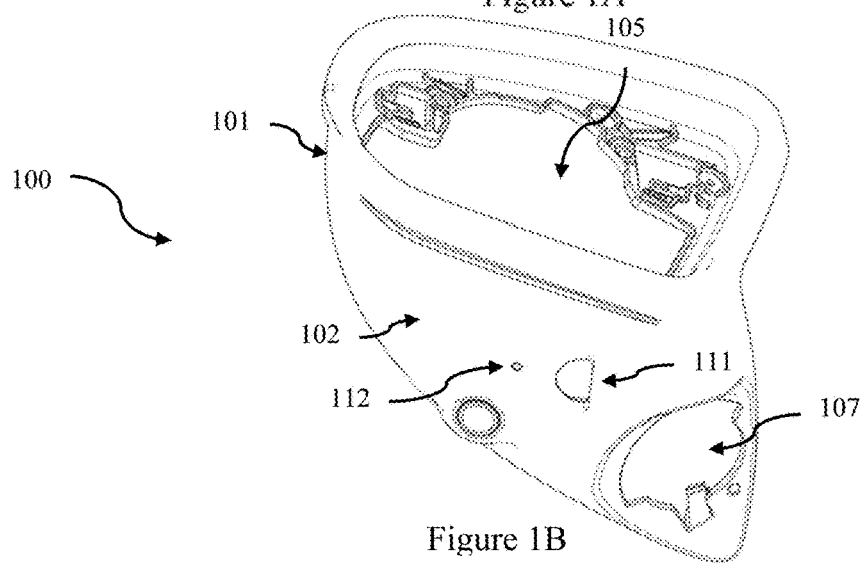
FIG. 1B is a isometric view showing the underside of the rear view side mirror shown in FIG. 1A according to an embodiment.

FIG. 1B is an isometric view showing the underside surface 102 of the exterior housing 101 of the rear view side mirror 100 shown in FIG. 1A. The underside surface 102 includes an approach lamp aperture 111 for projecting a broad spot beam 121 of light on the ground from the approach lamp 11 (in the combined approach lamp and logo lamp 1). The underside surface 102 also includes a logo lamp aperture 112 for projecting a logo 122 of light on the ground from the logo lamp 12 (in the combined approach lamp and logo lamp 1). Additional apertures may be provided in the underside surface 102 for projecting other beams, including both visible and invisible (eg IR) beams for sensing or illumination.

The size and shape of the projected spot beam 121 is determined by the optics of the approach lamp lens as well as the offset distance of the lens from the approach lamp aperture 111. Similarly the size and shape of the projected logo 122 is determined by the optics of the logo lamp lens as well as the offset distance of the lens from the logo lamp aperture 112. The approach lamp beam and logo may be projected forward and/or rearward of the side mirror and may be local to the side door, or it may extend along the full length of the vehicle. The approach lamp spot beam 121 may be used for general ground illumination for example to provide broad illumination for camera systems during low speed manoeuvring, whilst the logo lamp may be used to provide light to passengers when entering or exiting the vehicle. In other embodiments the approach lamp spot beam 121 can be used for passenger illumination, while a separate lamp can be used for manoeuvring. The approach lamp 11 and logo lamp 12 are spatially separated from each other within the combined approach lamp and logo lamp 1 and thus the approach lamp aperture 111 and logo lamp aperture 112 may be separate apertures in the underside surface 102. In another embodiment the approach lamp aperture 111 and the logo lamp aperture 112 are the same aperture which is an elongated aperture in which the approach lamp projection 123 projects out of a different portion of the aperture to the logo lamp projection 124. That is both the approach lamp 11 and logo lamp 12 utilise the same exit (or projection) aperture in the underside surface 102. In most embodiments the approach lamp and logo lamp are recessed from the lower surface to meet regulatory requirements. However in some alternative embodiments, the approach lamp and logo lamp could be configured to be flush with the underside surface 102.

Figure 2A:
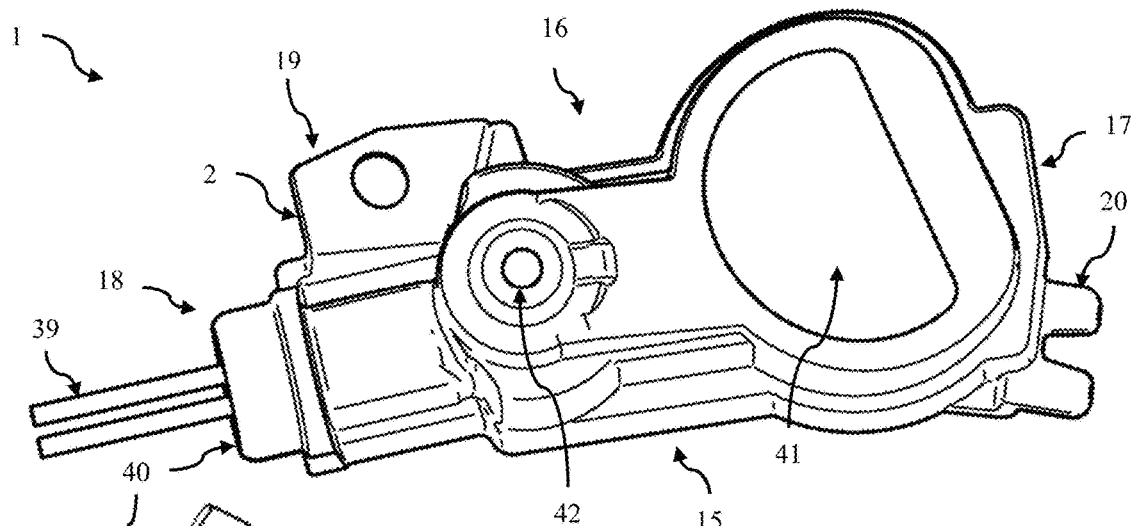
FIG. 2A is a first isometric view of a combined approach lamp and logo lamp according to an embodiment.
Figure 2B:
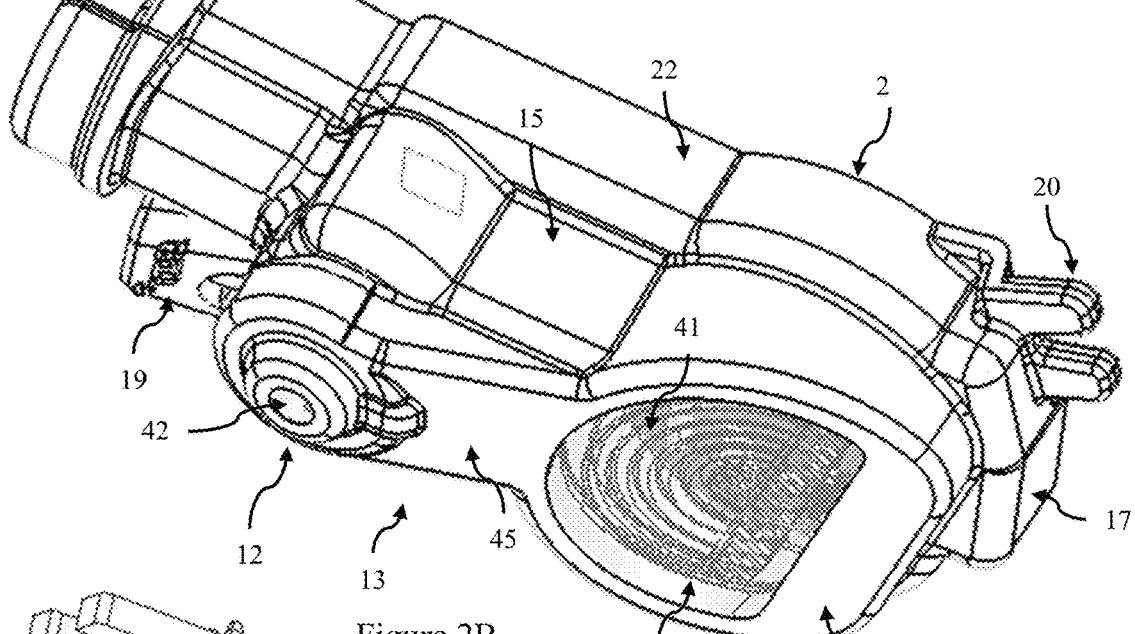
FIG. 2B is a second isometric view of the combined approach lamp and logo lamp of FIG. 2A.
Figure 2C:
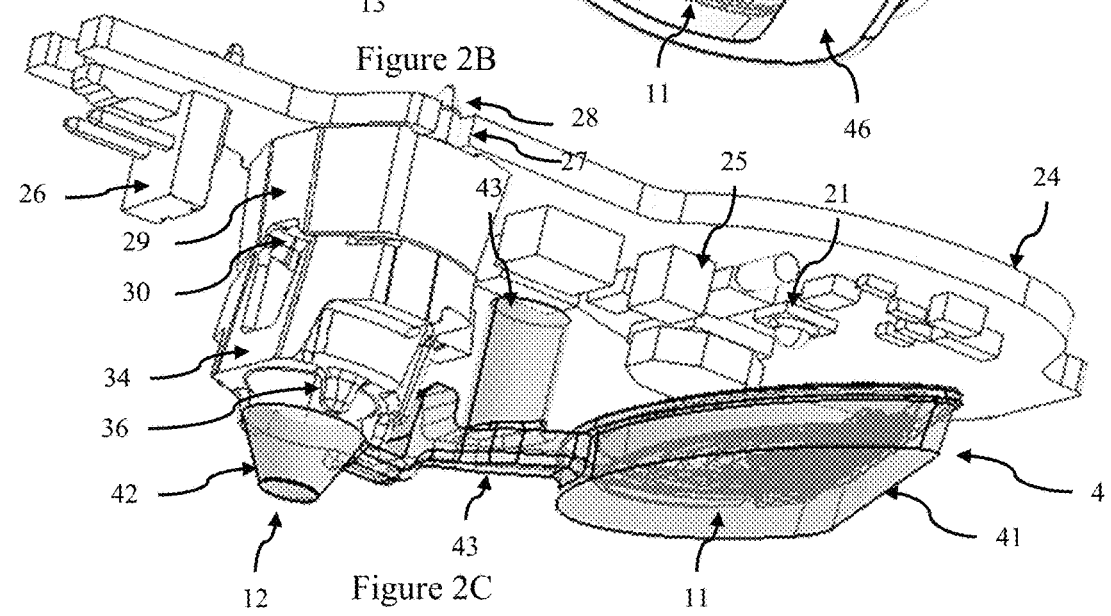
FIG. 2C is an isometric view of the combined approach lamp and logo lamp of FIG. 2B with the housing hidden.
Figure 3:
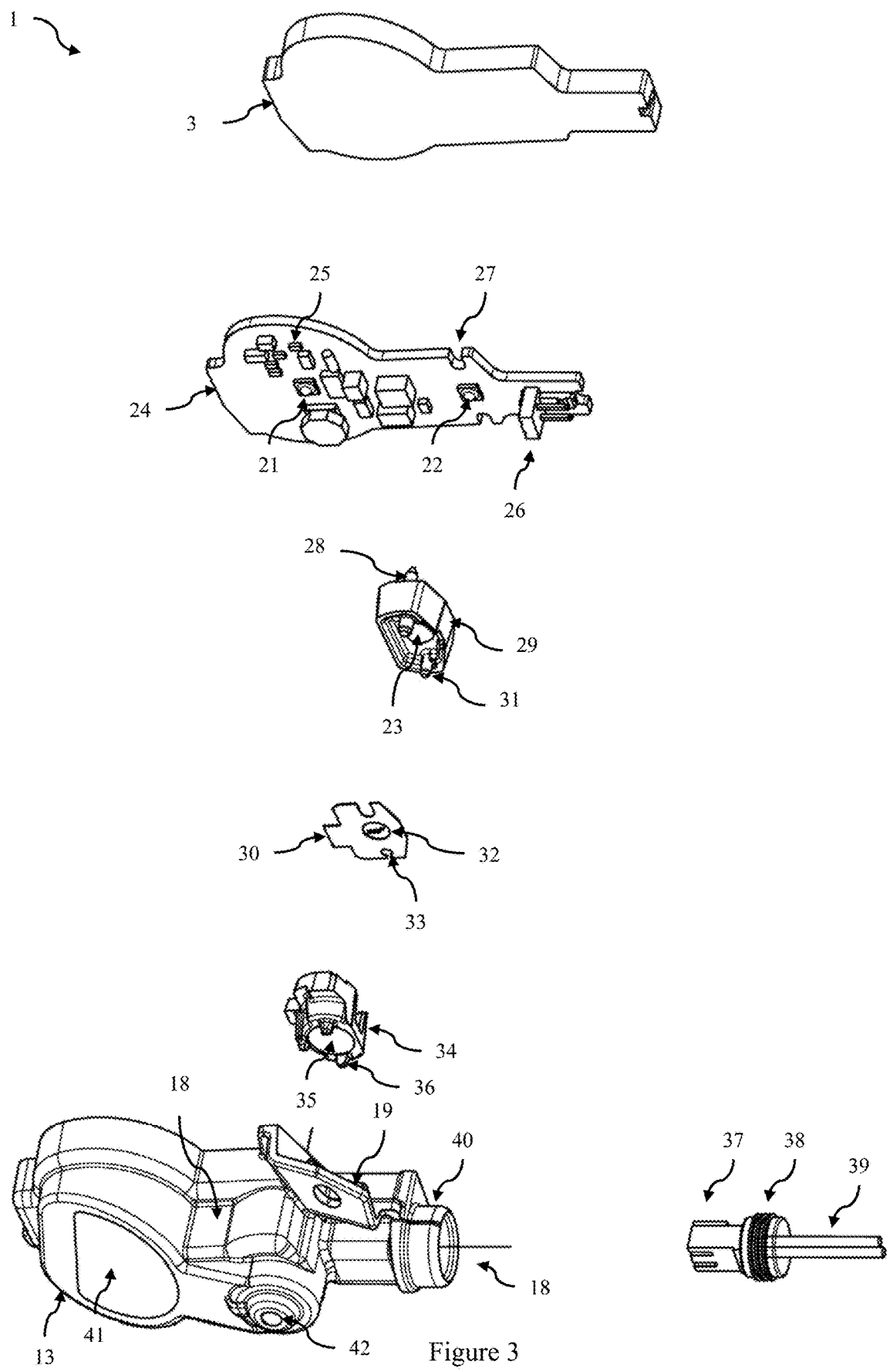
FIG. 3 is an exploded isometric view of the combined approach lamp and logo lamp of FIG. 2A.
Figure 4B:
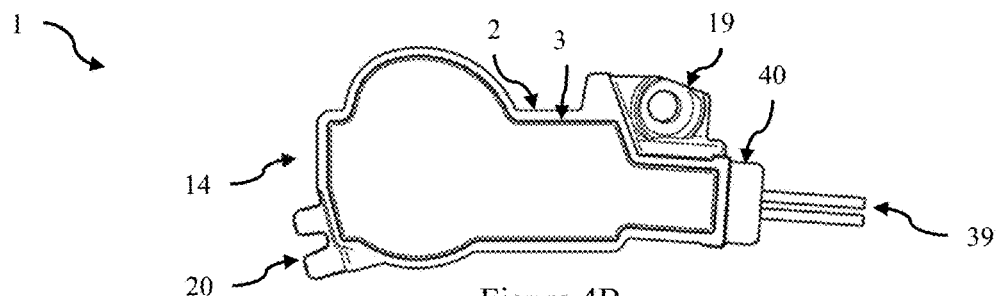
FIG. 4B is a rear view of the combined approach lamp and logo lamp of FIG. 2A.
Figure 4C:
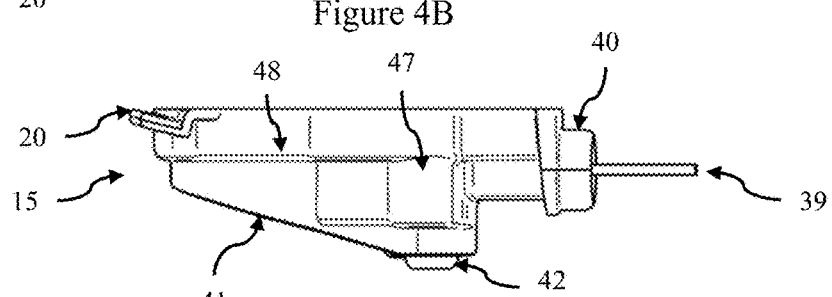
FIG. 4C is a first side view of the combined approach lamp and logo lamp of FIG. 2A.
Figures 4A, 4E, 4F:
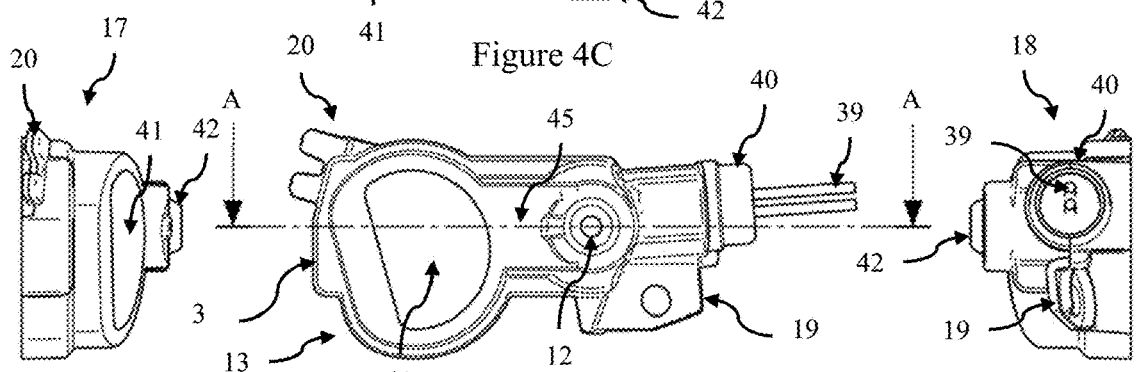
FIG. 4A is a front view of the combined approach lamp and logo lamp of FIG. 2A.
FIG. 4E is a top view of the combined approach lamp and logo lamp of FIG. 2A.
FIG. 4F is a bottom view of the combined approach lamp and logo lamp of FIG. 2A.
Figure 4D:
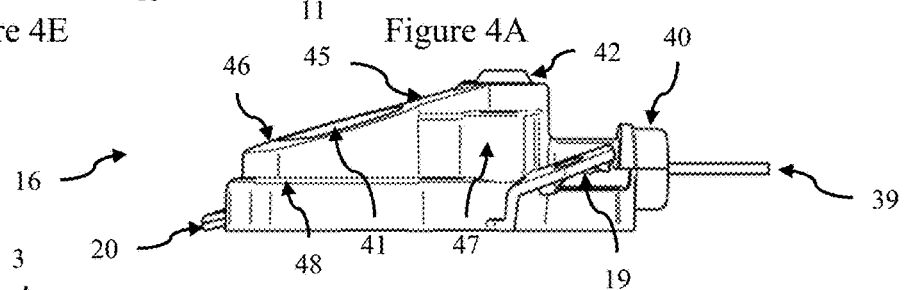
FIG. 4D is a second side view of the combined approach lamp and logo lamp of FIG. 2A.
Figure 4G:
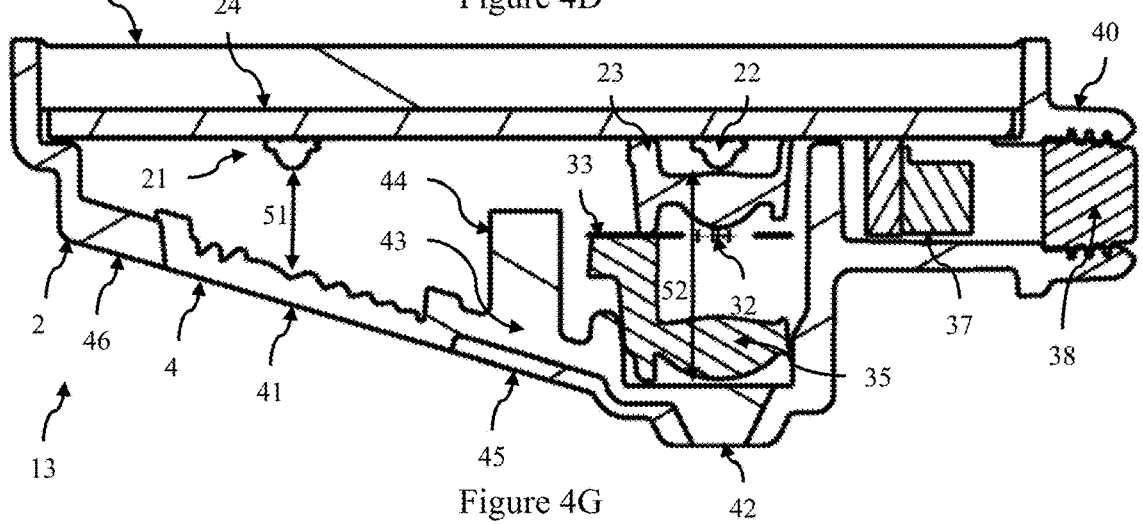
FIG. 4G is a sectional view of section AA of FIG. 4A.

An embodiment of the combined approach lamp and logo lamp 1 is shown in greater detail in FIGS. 2A though 4G. FIGS. 2A and 2B show a first and second isometric view of an embodiment of a combined approach lamp and logo lamp 1. FIG. 2C shows a similar view to FIG. 2B with the housing hidden (or removed) to show the arrangement of internal components including the lens component 4 and FIG. 3 is an exploded isometric view. FIGS. 4A, 4B, 4C 4D, 4E, and 4F are front, rear, first side, second side, top and bottom views. FIG. 4G is a sectional view through section AA of FIG. 4A.

The combined approach lamp and logo lamp 1 includes an opaque housing 2 with a front face 13, a first side face 15, a second side face 16, a top or distal face 17, and a bottom or proximal face 18. A rear surface 3 engages with the housing to form a rear face 14. The front face 13 includes a first aperture for the approach lamp 11 and a second aperture for the logo lamp 12 which are separated by an opaque bridging portion 45. When installed in a side mirror the front face 13 faces the inner surface of the underside surface 102. The location of the power connector housing 40 can act as a reference point such that the bottom face 18 is a proximal face with respect to location of the power connector and thus the top face 17 is the distal face. The mounting plate or flange 19 is located on the second side face 16 and is also proximal to the power connector 40 (and bottom or proximal face 18). Additionally the top face 17 includes a pair of mounting fingers which abut a support in the interior of the mirror housing (not shown).

A printed circuit board (PCB) 24 is mounted on or adjacent the rear surface 3 and includes a power connector 26, an electronic circuit 25 and a first light source 21 mounted in a first location on the printed circuit board, and a second light source 22 mounted in a second location on the printed circuit board. In this embodiment the first and second light sources are both LED light sources, but other light sources including laser or incandescent light sources could be used. The first light source is the light source for the approach lamp 11 and the second light sources is for the logo lamp 12. As can be seen in FIG. 3, the two light sources are spaced apart on the PCB.

The light sources are controlled via the electronic circuit 25 which receives power and control signals via wires of the cables 39 operatively connector to power connector 26. The power connector 26 includes two prongs which engage with a plug 37 which operatively connects the prongs to wires 39 through seal 38. The seal 38 is inserted into power connector housing 40 in the proximal face 18. The electronic circuit 25 may include a single circuit which can concurrently control each light source, for example to switch one or both light sources on or off via control signals sent on a single wire 39, or the electronic circuit may include two separate circuits, one for each light source allowing individual and independent control of the lamps via signals sent on two separate wires 39. In one embodiment the LEDs have ratings in the range 0.5-1.5 Watts each. The LED's may have the same ratings or different ratings. The use of two light sources generates heat, and to ensure adequate thermal dissipation of heat generated from the light sources, the PCB has a total area (or projected area) of at least 750 mm$^2$. Preferably the PCB has a total (or projected) area of at least 900 mm$^2$. The size of the PCB effectively sets the size of the rear surface.

The electronic circuit 25 may also allow adjustment of the relative light output, for example over a range from 0-100%. This adjustment may be performed individually for both light sources, or jointly. In some embodiments, the electronic circuit is configured to separately control the output of the light sources 21 22, and the output of each light source is controlled to limit the total output under a predetermined maximum thermal dissipation limit (or capability) $h_{max}$. Individual control of the light output (or intensity) is used to provide different lighting levels for different functions. For example for cases where the user is approaching the vehicle the logo and approach lamp may both be illuminated at similar intensities such 50% of a maximum intensity (or up to). However when manoeuvring with a camera the logo lamp may be turned off, and the approach lamp portion may be activated at a higher brightness (100%) in order to provide better vision or illumination for the camera. This higher brightness will generate additional heat (compared to the 50% brightness case) and thus this higher intensity can only be used when the logo lamp is not switched on otherwise the heat dissipation limit may be exceeded. In other modes, the lamps have different intensities (eg 25% logo, 75% approach), in which case the output of each light source is controlled to limit the total output under a predetermined maximum thermal dissipation limit (or capability) $h_{max}$. For example if the lamps are identical and generate heat at the same rate for the same input current, then we can define $i_{max}$ as the total current corresponding to the maximum thermal dissipation capability ($h_{max}$) and $i_1$ and $i_2$ are the approach lamp and logo lamp currents. Then the lamps are operated such that the sum of the individual lamp currents satisfy: $i_1+i_2 \leq i_{max}$. This can be rearranged to $i_1/i_{max}+i_2/i_{max} \leq 1$, so that maximum intensity corresponds to $i_{max}$ and the intensity is relative to this value. That is the light intensities are controlled to 0-100% of $i_{max}$ (more generally the current symbols i could be replaced with intensity or brightness measurements I). More generally if the ratings of the lamps are different, or generate heat at different rates then we have $f_1+f_2 \leq h_{max}$ where functions $f_1$ and $f_2$ are functions mapping an input parameter (eg current, voltage, etc) to heat output for each lamp. These may be obtained from fitting a function or creating a look up table from experimental test data and/or the theoretical estimates. The electronic circuit is then configured to ensure that in each mode the total heat output from both lamps stays within the acceptable limit $h_{max}$. For example the relationship between brightness or intensity and input current may be non-linear (or it may deviate from linear at larger currents). In further embodiments one or more temperature sensors are included in the electronic circuit, and the temperature is used in either the heat output estimates (ie inputs to $f_1$ and $f_2$) or to set the maximum heat dissipation limit. For example the maximum heat dissipation limit may depend upon (or vary with) the ambient temperature. As outlined above, the electronic circuit can be configured with a range of operational modes such that in each mode the total output remains under a predetermined maximum thermal dissipation limit. For example in the first mode both the first light source 21 and the second light source 22 are switched on with the same intensity, for example both at 50% of maximum intensity (or both at some level less <50%). In a second mode only one of the first light source 21 or second light source 22 is switched on (for example approach lamp light source 21), and generates light with an intensity larger than an intensity of the same light source when operated in the first mode (eg >50% of maximum intensity).

The combined approach lamp and logo lamp 1 includes a transparent lens component 4 which includes a first lens portion 41 and a second lens portion 42 separated from the first lens portion by an joining portion 43. The first lens portion 41 is located in the first aperture of the front face of the housing, and orientated to focus light from the first light source 21. Similarly the second lens portion 42 is located in the second aperture and orientated to focus light from the second light source 22 via an optical assembly including a logo element, and the joining portion 43 is covered by the opaque bridging portion 45 to prevent stray light from one lens/lamp affecting the other lens/lamp. Additionally a support area 46 surrounding the lens is opaque to further reduce stray light emissions. That is whilst the first lens portion and second lens portions are joined, there is no overlap in light output through the lens component 4 so that the approach lamp and logo lamp project through different areas of the one lens component 4.

The opaque housing 2 and transparent lens component 4 are formed as a two component injection moulded part. An injection moulding plug 44 is located below joining portion 43. This allows both lens portions 41, 42 of the lens component 4 to be formed as a single transparent (or translucent) part and the housing to formed as an opaque part so that an opaque lens bridging portion 45 can be provided to both separate the two lens portions 41 and 42 and prevent stray light from one lamp affecting the other lamp. The surrounding support area 46 is also opaque further assisting in reducing stray light emissions.

Figure 5A:
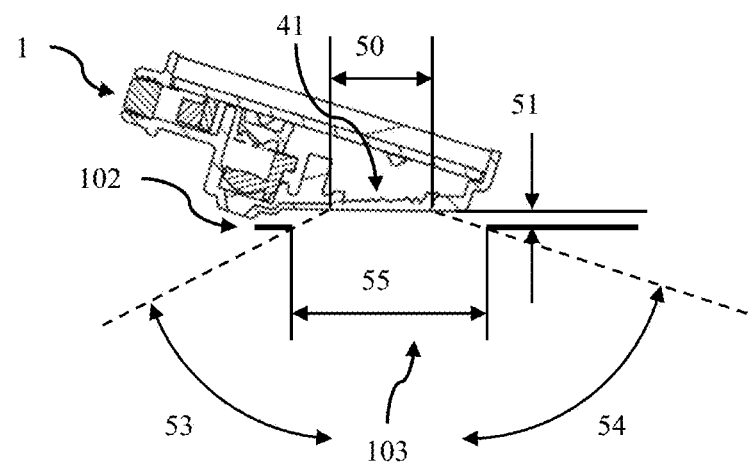
FIG. 5A is a side sectional view of the combined approach lamp and logo lamp of FIG. 2A mounted above the lower surface of a mirror housing in a first offset position according to an embodiment.

The first lens portion 41 is angled relative to a plane containing the PCB surface 24 so that the distance 51 from the first light source 21 to an outer surface of the first lens portion 41 is less than the distance 52 from the second light source 22 to an outer surface of the second lens portion 42. As shown in FIGS. 1A and 1B, and FIG. 5A, when the housing is mounted in the side mirror housing 101, the combined approach lamp and logo lamp housing 2 is mounted so that the first lens portion 41 and the second lens portion 42 are adjacent the approach lamp aperture 103 and logo lamp aperture 104 respectively (or adjacent a single aperture if a single common aperture is provided in the side mirror housing). In this embodiment first lens portion 41 is angled with respect to the plane containing the PCB surface 24 and second lens portion 42 is parallel to the plane containing the PCB surface 24. In this embodiment the first lens portion 41 is angled with respect to the plane containing the PCB surface 24 with an angle of around 15°. In other embodiments the angle is in the range of 0° to 30° and more preferably in the range of 15° to 20° to maximise approach lamp efficiency and to fit to the side mirror. Angling of the first lens portion 41 improves the fit of the combined approach lamp and logo lamp 1 to the side mirror housing 101.

The first light source 21 and first lens portion 41 form the approach lamp 11. The first lens portion is formed as a semi-circular Fresnel lens to form a wide spot beam capable of projecting light forward and rearward of the lens at angles as large as 75° to the vertical. In other embodiments the lens could be a freeform or total internal reflection lens, in particular in form of a light pipe. The second light source 22, optical assembly and second lens portion 42 form the logo lamp 12. The optical assembly includes a first spacer housing 29, a logo plate 30 and a second spacer housing 34. The first spacer housing 29 includes a pair of projections 28 which locate into matching mounting apertures 27 in the PCB 24. The first spacer housing 29 includes a first logo lamp lens 23 which is located above second light source 22

(or aligned to collect light from second light source 22), and logo plate mounting projections 31. The logo plate 30 includes logo plate mounting apertures 33 which receive the logo plate mounting projections 31, and a logo element 32 which receives light from the first logo lamp lens 23. The second spacer housing 34 includes a second logo lamp lens 35 which directs light passing through the logo element 32 towards the second lens portion 42. The second spacer housing 34 further includes spacer projections 36 to support the second lens portion 42 as shown in FIG. 2C. The first spacer housing 29 and second spacer housing 34 are formed as moulded pieces with the logo lamp lenses and mounting features moulded in the same piece.

As shown in FIG. 1A the vehicle side mirror 100 includes a side mirror housing 101 with a lower surface 102 (that is when installed the lower surface 102 is proximal to the ground). The combined approach lamp and logo lamp 1 is mounted within the housing 101 such that the lens component 4 is mounted such the first lens portion 41 is parallel to the lower surface 102 and the first lens portion projects light through an approach lamp aperture 103 in the lower surface 102. This is further illustrated in FIG. 5A which is a side sectional view of the combined approach lamp and logo lamp of FIG. 2A mounted above the lower surface 102 of a mirror housing 101. The first lens portion 41 has a first width 50, and is mounted in a first offset position at an offset distance 51 from the outer surface of the lower surface 102 of the side mirror housing. The approach lamp aperture 103 has a second width 55 which is wider than the first width 50 of the first lens portion 41. In this embodiment the approach lamp projects light both forward and rearward at a forward angle 53 and a rearward angle 54. Vehicles are requiring larger illumination angles to both please the end user and allow camera systems to see around the car. For example in the case of a 5 m long vehicle with the side mirror 2 m from the front and 1 m from the ground, then the required forward angle 53 is 63° and the required rearward angle 54 is 72°.

Figure 5B:
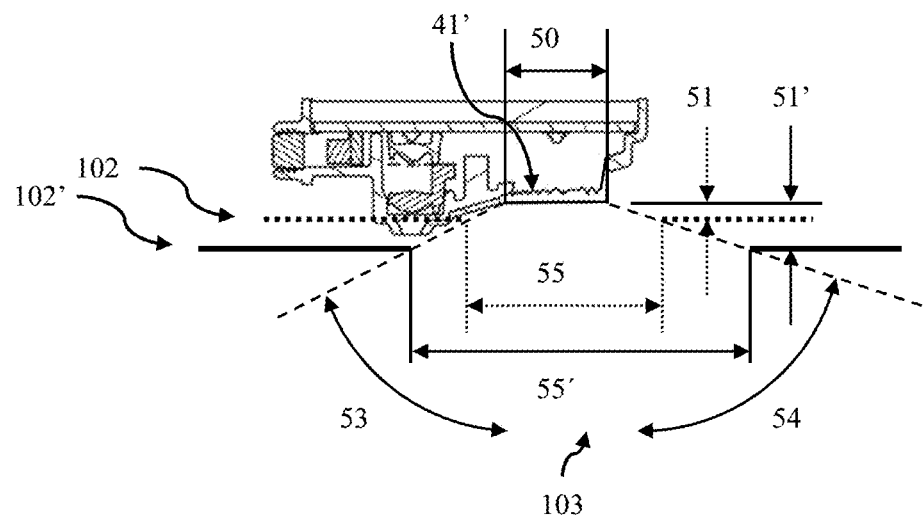
FIG. 5B is a side sectional view of a combined approach lamp and logo lamp with the approach lamp lens portion mounted parallel to the PCB board.

As will be shown below, the use of an angled approach lamp lens 41 compared to an approach lamp lens parallel to the PCB surface can dramatically affect the required width of the approach lamp aperture 103. A shown in FIG. 5A, an angled approach lamp lens 41 is used. In the case that the first width 50 of the first lens portion is 7 mm, and located at a first offset distance 51 of 3 mm then the required second width 55 of the approach lamp aperture 103 is 22 mm. FIG. 5B shows a similar arrangement with an approach lamp lens 41' with the same first width 50 of 7 mm, but aligned to be parallel with the PCB surface. This effectively recesses the approach lamp lens 41' with respect to the lower surface 102' and this has a dramatic effect on the size of the aperture 103' in the lower surface 102'. In the scenario shown in FIG. 5B the combined approach and logo lamp uses an approach lamp lens (first lens portion 41) which is parallel to the PCB and the lower surface 102. Due to the size of the optical assembly of the logo lamp this forces and increase in the offset distance between the lower surface 102' and the first lens portion 41' by 5 mm—from a second offset distance 51 of 3 mm in FIG. 5A to a second offset distance 51' of 8 mm in FIG. 5B. This has a dramatic effect on the required width of the approach lamp aperture 103', as to maintain the require opening angles 53 and 54, the second width 55' must be increased to 47 mm—an increase of 25 mm which is more than double the size of the second width 55 in FIG. 5A. For reference the location of the lower surface 102, initial offset distance 51 and initial width 55 shown in FIG. 5A, all with respect to the first lens surface 41, are shown in FIG. 5B as dotted lines.

This is undesirable as using a larger opening can compromise styling or induce wind noise. Alternatively if a large recess (offset distance) is used with a small aperture then this reduces the range of illumination angles thus reducing performance (ie less of the car is illuminated). These effects are particularly important when the combined approach and logo lamp is used in small mounting locations, such as in a camera pod rather than a side mirror, or in a small side mirror. Thus the use of an angled approach lamp lens portion 41, rather than a lens parallel to the PCB provides the advantage of enabling small openings in the lower surface of the side mirror housing (or similar housing).

The above embodiments have been described in relation to mounting in a side mirror housing. In one embodiment a side mirror apparatus is provided including a housing including a lower surface which in use is proximal to the ground, and the lower surface includes at least one aperture 103, and a combined approach lamp and logo lamp apparatus mounted within the housing such that PCB 24 is angled with respect to the lower surface 102 and the first lens portion 41 is parallel to the lower surface 102 and projects light through one of the at least one aperture 103. However the combined logo and approach lamp could be provided in other similar vehicle structures such as a camera pod or sensing pod mounted on the exterior of a vehicle (whether on the side, front, rear, or other location).

Other variations are possible. In the above embodiment the housing 2 forming part of the two component injection moulded part includes the front face 13, the first side face 15, the a second side face 16, the top face 17, and the bottom face 18, which engages with a separate rear surface, and the entire housing is opaque. In one embodiment the housing 2 and lens component 4 are a multi component injection moulded part, such that lens component 4 is a transparent part, the front face 13 of the housing is one part and is opaque, and the remaining part of the housing is at least another part which is not necessarily opaque. In another embodiment the PCB 24 forms the rear surface 3. In another embodiment the housing forming part of the two component moulded part includes just the front face 13 with apertures for the first and second lens portions (ie the approach and logo lamp lens of the lens component 4). This housing could be received on second housing including the first side face 15, the second side face 16, the top face 17, the bottom face 18 and the rear face 13.

The combined approach lamp and logo lamp apparatus has a number of advantages. First the use of a two component moulded opaque housing and transparent lens component provides improved separation of the two light exiting faces (the approach lamp lens portion 41 and logo lamp lens portion 42) whilst maintaining a low part count. The two component moulded part allows both lens to be formed as a single transparent (or translucent) part and the housing to formed as an opaque part so that an opaque lens bridging portion 45 can be provided to both separate the two lens portions 41 and 42 and prevent stray light from one lamp affecting the other lamp. The surrounding support area 46 is also opaque further assisting in reducing stray light emissions. Further the PCB is sized for adequate thermal management, and angling the approach lamp lens 41 with respect to the PCB 24 plane allows the approach lamp lens to be parallel with an opening in the side mirror housing, which minimises the size of the opening (ie enables a small opening) in the lower surface of the side mirror housing. This also allows for a better fit of the combined approach lamp and logo lamp to the mirror housing.

Figure 6:
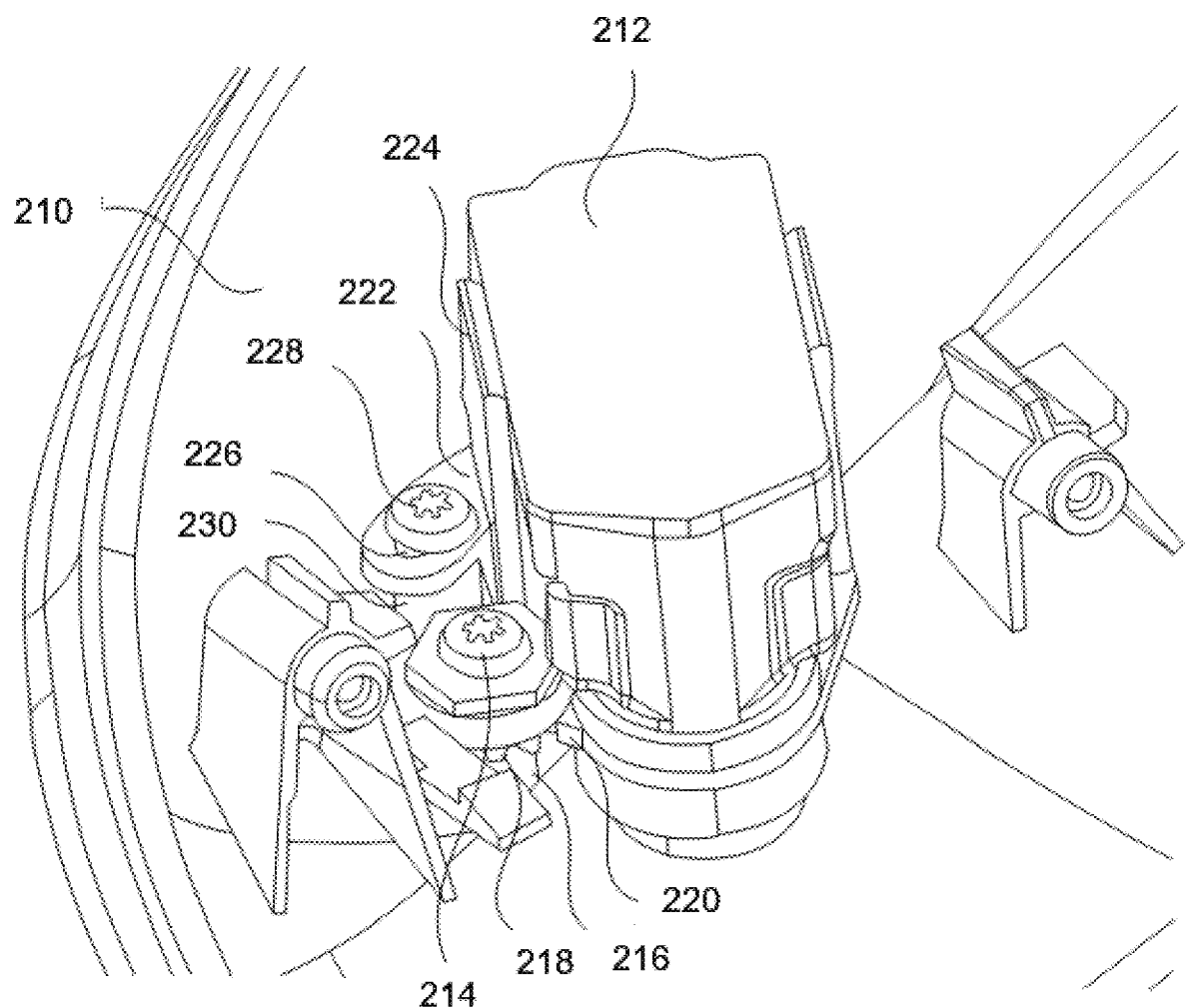
FIG. 6 is a perspective view of a mirror housing part with a first adjustable module for a combined approach lamp and logo lamp, from the inside.

A rear view assembly can have a mirror head movably attached to a mirror foot (not shown) and an adjustable module 212 for a combined approach lamp and logo lamp surface, with the module 212 being attached to an inner surface of a mirror housing part in form of a mirror head cup 210, as shown in FIG. 6. The mirror head cup 210, when mounted to a vehicle (not shown), is forward facing in the direction of the vehicle's longitudinal axis. Components such as the module 212 are mounted to the mirror head cup 210 either directly or indirectly linked with it by means of holding elements. In the example shown in FIG. 6, the mounting is directly made at the mirror head cup 210.

In order to be able to correct tolerance-related position deviations of the module 212, an adjusting screw 214 is provided which is inserted in a screw boss 216 of the mirror head cup 212. Snap-in elements 218 are provided at the adjusting screw 214 which engage with complementary snap-in elements 220 of the module 212.

By turning the adjusting screw 214, the module 212 can be tilted so that its position relative to the mirror head cup 210 can be corrected. In this process, the movement of the module 212 is controlled by means of a link bracket 222 which is formed at a housing 224 of the module 212 and includes a bent elongated hole 226. A fixing screw 228 being inserted in a screw boss 230 of the mirror head cup 210 is led through the elongated hole 226. As soon as the module 212 is moved to its target position by turning the fixing screw 214, it can be fixed in this position by tightening the fixing screw 228.

Figure 7:
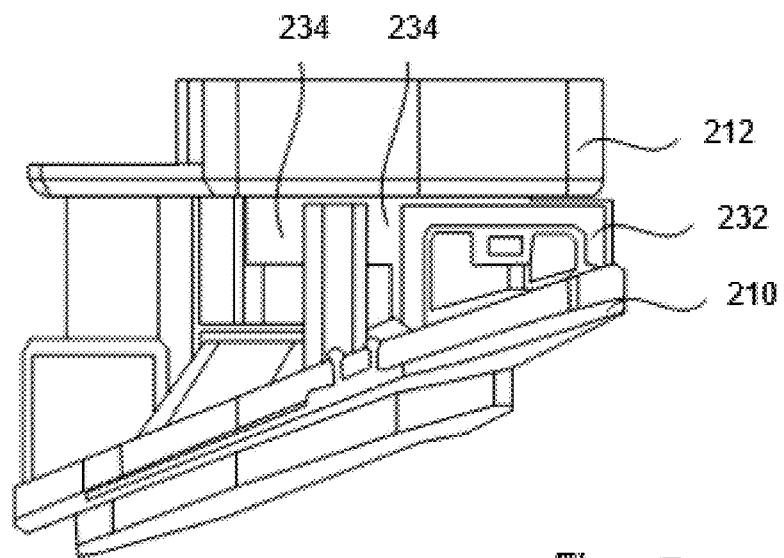
FIG. 7 is a partial sectional view of a mirror housing part with a second adjustable module for a combined approach lamp and logo lamp.

An alternative embodiment is shown in FIG. 7 in cross section, with the module 212 being indirectly linked with the mirror head cup 210 by means of a holding device 232. Adjusting elements 234 are provided as well by means of which the position of the module 212 relative to the mirror head cup 210 can be adjusted.

Figure 8:
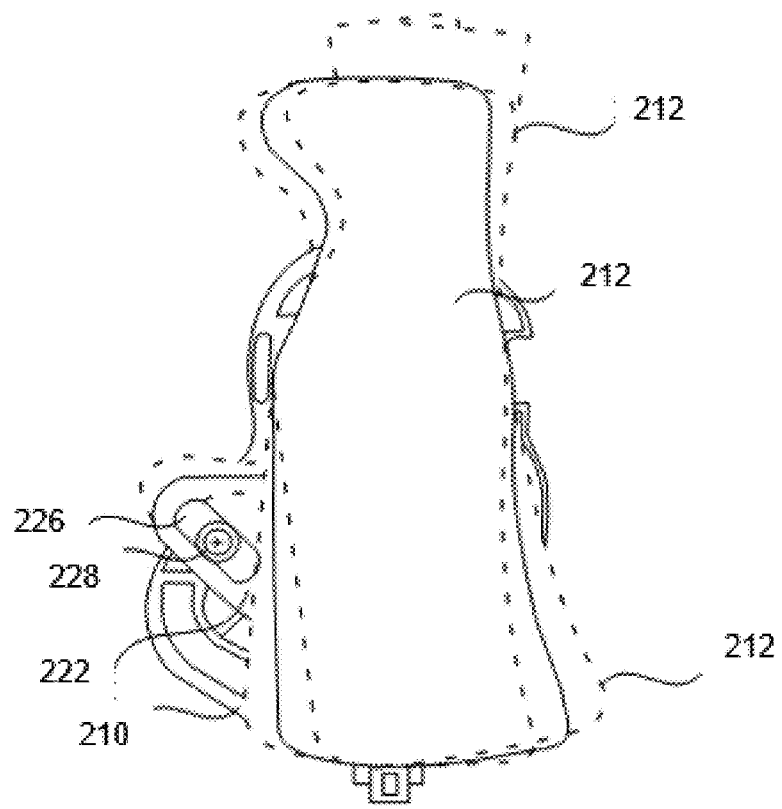
FIG. 8 is a top view of a third adjustable module for a combined approach lamp and logo lamp, in different adjustment positions.

FIG. 8 illustrates in top view the tilting of the projector module 212, guided via the link bracket 222. The maximum tilt angle in the illustrated example is approx. +/−6° around a centre position of the module 212, limited by the stops of the elongated hole 226. The dashed outlines each show the end positions of the module 212.

Figure 9:
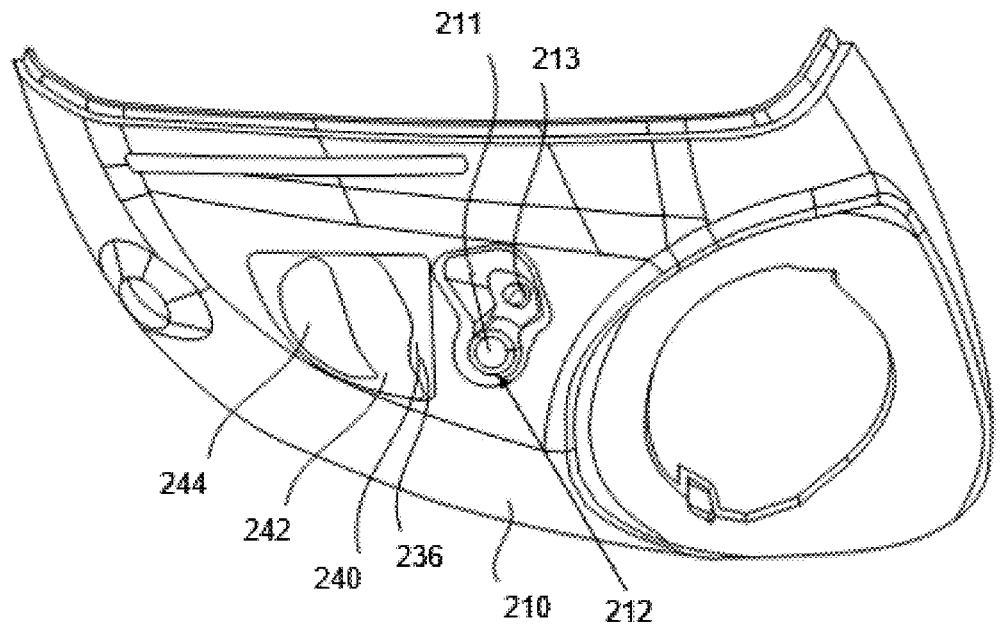
FIG. 9 is a perspective view of a mirror housing part with a fourth adjustable module for a combined approach lamp and logo lamp module from the outside.
Figure 10:
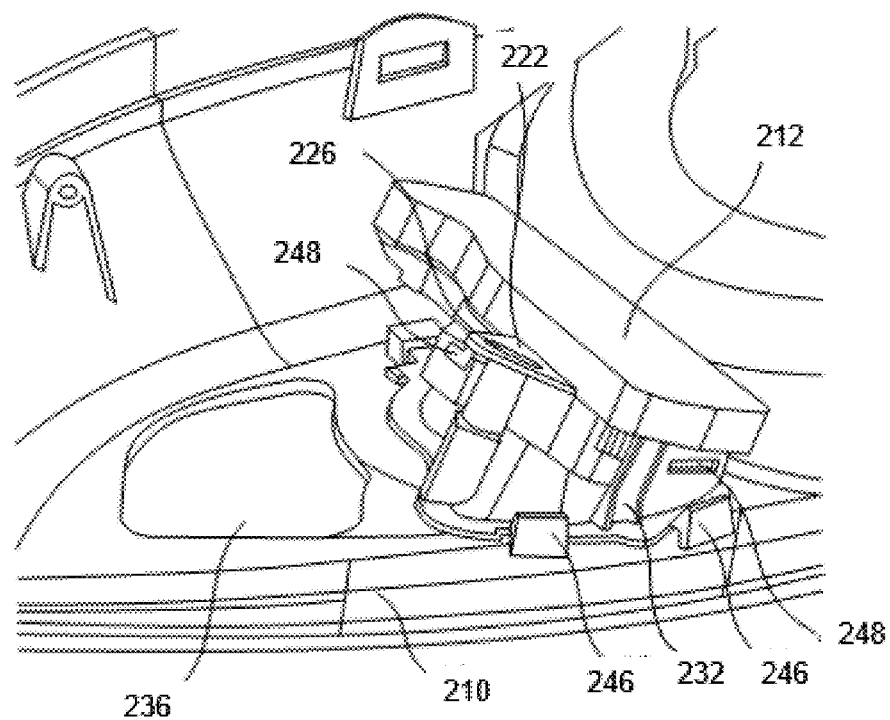
FIG. 10 is a detailed view of the mirror housing part according to FIG. 9 with a mounted, adjustable module, from the inside.
Figure 11:
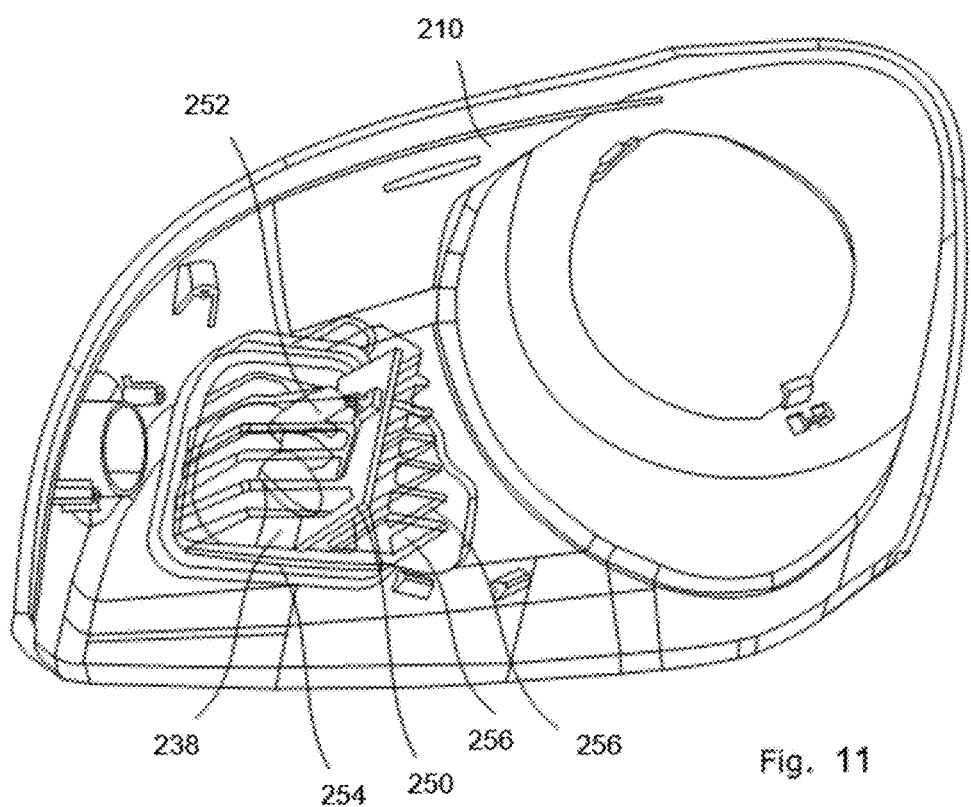
FIG. 11 is a detailed view of the mirror housing part according to FIG. 9 with an additionally mounted manoeuvring light module, from the inside. In the following description, like reference characters designate like or corresponding parts throughout the figures.

A further embodiment of a rear view assembly is shown in FIGS. 9 through 11. FIG. 9 shows an external view of a mirror head cup 210 which, on the one hand, carries an adjustable module 212 with its integrated projector or logo lamp 211 and an ambient or approach lamp 213 and, on the other hand, provides a window 236 for a manoeuvring light 238, shown in more detail in FIG. 11. The additional manoeuvring light 338 projects light through the window 236, the emission area being determined by a plastic aperture 240. The latter includes an opaque partial area 242, for example made from polycarbonate, and a transparent coloured partial area 244, for example made from polymethyl methyl acrylate coloured in blue.

FIG. 10 shows the mirror head cup 210 of FIG. 9, from the mirror head inside, with the module 212 with being fixed to the mirror head cup 210 by means of a holding device 232. The holding device 232, in turn, is attached to the mirror head cup 210 by means of clip connectors 246. Further clip connectors 248 fix the module 212 to the holding device 232. The link bracket 222 for adjusting the position of the projector module 212 can also be seen.

In the illustration in FIG. 11 the manoeuvring light 238 is shown as a module and in a mounted condition. The module includes a circuit board 250 with lighting elements that emit light in the direction of the window 236 by means of fibre-optic light guides 252. The manoeuvring light 238 is included in a two-component housing 254 consisting of transparent acrylonitrile-butadiene-styrene-copolymer towards the window 236 and including cooling fins 256 made from aluminium for heat dissipation. An ambient lighting is possible by means of the manoeuvring light 238, in addition to the combined approach lamp and logo lamp module 12.

All in all, a rear view assembly is thus created that enables an exact adjustment of the position of the module 212 so that this can provide a projection of a logo onto the road free from distortions. At the same time, further lighting variants are connected with or even integrated in the module 212. This increases the application area in a minimum space.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims.

Please note that the following claims are provisional claims only, and are provided as examples of possible claims and are not intended to limit the scope of what may be claimed in any future patent applications based on the present application. Integers may be added to or omitted from the example claims at a later date so as to further define or re-define the scope.

REFERENCE LIST 1 combined approach lamp and logo lamp
2 opaque housing
3 rear surface
4 transparent lens component
11 approach lamp
12 logo lamp
13 front face
15 first side face
16 second side face
17 top or distal face
18 bottom or proximal face
19 mounting plate or flange
21 first light source
22 second light source
23 first logo lamp lens
24 printed circuit board
25 electronic circuit
26 power connector
27 mounting apertures
28 pair of projections
29 first spacer housing
30 logo plate
31 logo plate mounting projections
32 logo element 33 logo plate mounting apertures
34 second spacer housing
35 second logo lamp lens
36 spacer projections
37 plug
38 seal
39 power and command cables
40 power connector housing
41, 41' first lens portion
42 second lens portion
43 joining portion
44 injection moulding plug
45 opaque bridging portion
46 support area
50 first width
51, 51' distance
52, 52' distance
53 forward angle
54 rearward angle
55, 55' second width
100 rear view side mirror
101 exterior housing
102, 102' underside or lower surface
103, 103' approach lamp aperture
104 logo lamp aperture
105 mirror aperture
106 interior housing
107 mounting aperture
111 approach lamp aperture
112 logo lamp aperture
121 spot beam
122 logo
123 approach lamp projection
124 logo lamp projection
210 mirror head cup
211 projector or logo lamp
212 combined approach lamp and logo lamp module
213 ambient or a approach lamp
214 adjusting screw
216 screw boss
218 snap-in element
220 snap-in element
222 link bracket
224 housing
226 elongated hole
228 fixing screw
230 screw boss
232 holding device
234 adjusting element
236 window
238 manoeuvring light
240 plastic aperture
242 opaque partial area
244 transparent coloured partial area
246 clip connector
248 clip connector
250 circuit board
252 fibre-optic light guide
254 housing
256 cooling fins

What is claimed is:

1. A combined approach lamp and logo lamp apparatus for use in an external rear view assembly comprising at least one aperture, the apparatus comprising:
a housing comprising a rear view face and a front face with the at least one aperture;
a printed circuit board (PCB) mounted adjacent the rear face, the printed circuit board further comprising:
a power connector;
an electronic circuit;
a first light source mounted in a first location on the printed circuit board; and
a second light source mounted in a second location on the printed circuit board; and
a transparent lens component comprising a first lens portion and a second lens portion,
wherein the housing and the lens component are formed as a two component moulded part so that the first lens portion is orientated to focus light from the first light source and the second lens portion is orientated to focus light from the second light source via an optical assembly comprising a logo element, and
the first lens portion is angled relative to a plane containing the PCB surface so that a distance from the first light source to an outer surface of the first lens portion is less than a distance from the second light source to an outer surface of the second lens portion, with, in use, the housing being mounted so that the first lens portion and the second lens portion are adjacent the at least one aperture in the side mirror housing,
wherein the at least one aperture comprises a first aperture and a second aperture separated by an opaque bridging portion,
the first lens portion is located in the first aperture and the second lens portion is located in the second aperture, and
the second lens portion is separated from the first lens portion by a joining portion, with the joining portion being covered by the opaque bridging portion.

2. The combined approach lamp and logo lamp apparatus as claimed in claim 1, wherein the PCB has an area of at least 750 mm$^2$, at least 900 mm$^2$, or at least 1100 mm$^2$.

3. The combined approach lamp and logo lamp apparatus as claimed in claim 1, wherein the electronic circuit is configured to separately control the output of the first light source and the output of the second light source, and the output of each light source is controlled to limit the total output under a predetermined maximum thermal dissipation limit.

4. The combined approach lamp and logo lamp apparatus as claimed in claim 1, wherein both light sources are actuated at the same time, with a resettable fuse for an overheat control being provided.

5. The combined approach lamp and logo lamp apparatus as claimed in claim 3, wherein the electronic circuit is configured to operate the combined approach lamp and logo lamp apparatus in at least two modes, wherein in each mode the total output remains under a predetermined maximum thermal dissipation limit, and in the first mode both the first light source and the second light source are switched on, and in the second mode only one of the first light source or second light source is switched on, and generates light with an intensity larger than an intensity of the same light source when operated in the first mode.

6. The combined approach lamp and logo lamp apparatus as claimed in claim 1, wherein the first lens portion is angled with respect to the plane containing the PCB surface, with at least one of the first lens portion being angled with respect to the plane containing the PCB surface with an angle in the range of 10° to 25° or 15° to 20°, or the first lens portion is of the light pipe type or multi-faceted.

7. The combined approach lamp and logo lamp apparatus as claimed in claim 1, wherein the second lens portion is at least one of parallel to a plane containing the PCB surface or recessed.

8. The combined approach lamp and logo lamp apparatus as claimed in claim 1, wherein the first light source comprises an approach lamp, the first lens portion has a first width and is mounted in a first offset position at an offset distance from an outer surface of a lower surface of the side mirror housing, and the approach lamp aperture has a second width which is wider than the first width of the first lens portion, with the approach lamp projecting light both forward and rearward at a forward angle between 50° and 65° and a rearward angle between 50° and 75°.

9. The combined approach lamp and logo lamp apparatus as claimed in claim 1, wherein a rear surface supports the PCB with the power connector, which comprises two prongs which engage with a plug which operatively connects the prongs to cables through a seal.

10. The combined approach lamp and logo lamp apparatus as claimed in claim 1, further comprising a power connector housing in a proximal face provided by the housing which is opaque and further comprises a first side face, a second side face and a distal face, the proximal face comprising an aperture for receiving at least one cable.

11. The combined approach lamp and logo lamp apparatus as claimed in claim 1, further comprising at least one of
a mounting flange for mounting the combined approach lamp and logo lamp apparatus to an interior housing of the external rear view assembly through an aperture, with the mounting flange being located on either the first side face or the second side face, and the rear surface engages with the housing to form a rear face; or
connection means for a screw, a snap or a clip connection for mounting the combined approach lamp and logo lamp apparatus to the external rear view assembly via an adaptor.

12. The combined approach lamp and logo lamp apparatus as claimed in claim 1, further comprising an adjusting device for spatially adjusting the apparatus relative to a housing part of the rear view assembly, relative to at least one of a housing cap or a mirror foot cover,
wherein the adjusting device comprises at least one first adjusting element being arranged at the apparatus or formed together with an apparatus housing, provides at least one translational degree of freedom along at least one shifting axis or at least one rotational degree of freedom around at least one rotational axis.

13. An external rear view assembly for a motor vehicle, comprising the combined approach lamp and logo lamp apparatus as claimed in claim 1.

14. The external rear view assembly as claimed in claim 12, wherein at least one of
the adjusting device comprises at least one second adjusting element that is arranged at or formed together with a holding device for at least one of the apparatus or the housing part, or
the adjusting device comprises at least one fixing element for fixing the apparatus in a position adjusted using the adjusting device via at least one of one or more fixing screws or bonding.

15. A motor vehicle comprising an external rear view assembly as claimed in claim 13.

16. A combined approach lamp and logo lamp apparatus for use in an external rear view assembly comprising at least one aperture, the apparatus comprising:

a housing comprising a rear view face and a front face with the at least one aperture;
a printed circuit board (PCB) mounted adjacent the rear face, the printed circuit board further comprising:
a power connector;
an electronic circuit;
a first light source mounted in a first location on the printed circuit board; and
a second light source mounted in a second location on the printed circuit board; and
a transparent lens component comprising a first lens portion and a second lens portion,
wherein the housing and the lens component are formed as a two component moulded part so that the first lens portion is orientated to focus light from the first light source and the second lens portion is orientated to focus light from the second light source via an optical assembly comprising a logo element,
the first lens portion is angled relative to a plane containing the PCB surface so that a distance from the first light source to an outer surface of the first lens portion is less than a distance from the second light source to an outer surface of the second lens portion, with, in use, the housing being mounted so that the first lens portion and the second lens portion are adjacent the at least one aperture in the side mirror housing, and
at least one of:
the electronic circuit is configured to separately control the output of the first light source and the output of the second light source, and the output of each light source is controlled to limit the total output under a predetermined maximum thermal dissipation limit, or
both light sources are actuated at the same time, with a resettable fuse for an overheat control being provided.

17. A combined approach lamp and logo lamp apparatus for use in an external rear view assembly comprising at least one aperture, the apparatus comprising:
a housing comprising a rear view face and a front face with the at least one aperture;
a printed circuit board (PCB) mounted adjacent the rear face, the printed circuit board further comprising:
a power connector;
an electronic circuit;
a first light source mounted in a first location on the printed circuit board; and
a second light source mounted in a second location on the printed circuit board; and
a transparent lens component comprising a first lens portion and a second lens portion,
wherein the housing and the lens component are formed as a two component moulded part so that the first lens portion is orientated to focus light from the first light source and the second lens portion is orientated to focus light from the second light source via an optical assembly comprising a logo element,
the first lens portion is angled relative to a plane containing the PCB surface so that a distance from the first light source to an outer surface of the first lens portion is less than a distance from the second light source to an outer surface of the second lens portion, with, in use, the housing being mounted so that the first lens portion and the second lens portion are adjacent the at least one aperture in the side mirror housing, and at least one of:
- a rear surface supports the PCB with the power connector, which comprises two prongs which engage with a plug which operatively connects the prongs to cables through a seal, or
- the combined approach lamp and logo lamp apparatus further comprises a power connector housing in a proximal face provided by the housing which is opaque and further comprises a first side face, a second side face and a distal face, the proximal face comprising an aperture for receiving at least one cable.

18. A combined approach lamp and logo lamp apparatus for use in an external rear view assembly comprising at least one aperture, the apparatus comprising:
- a housing comprising a rear view face and a front face with the at least one aperture;
- a printed circuit board (PCB) mounted adjacent the rear face, the printed circuit board further comprising:
  - a power connector;
  - an electronic circuit;
  - a first light source mounted in a first location on the printed circuit board; and
  - a second light source mounted in a second location on the printed circuit board;
- a transparent lens component comprising a first lens portion and a second lens portion; and
- at least one of
  - a mounting flange for mounting the combined approach lamp and logo lamp apparatus to an interior housing of the external rear view assembly through an aperture, with the mounting flange being located on either the first side face or the second side face, and the rear surface engages with the housing to form a rear face; or
  - connection means for a screw, a snap or a clip connection for mounting the combined approach lamp and logo lamp apparatus to the external rear view assembly via an adaptor
- wherein the housing and the lens component are formed as a two component moulded part so that the first lens portion is orientated to focus light from the first light source and the second lens portion is orientated to focus light from the second light source via an optical assembly comprising a logo element, and
- the first lens portion is angled relative to a plane containing the PCB surface so that a distance from the first light source to an outer surface of the first lens portion is less than a distance from the second light source to an outer surface of the second lens portion, with, in use, the housing being mounted so that the first lens portion and the second lens portion are adjacent the at least one aperture in the side mirror housing.

19. A combined approach lamp and logo lamp apparatus for use in an external rear view assembly comprising at least one aperture, the apparatus comprising:
- a housing comprising a rear view face and a front face with the at least one aperture;
- a printed circuit board (PCB) mounted adjacent the rear face, the printed circuit board further comprising:
  - a power connector;
  - an electronic circuit;
  - a first light source mounted in a first location on the printed circuit board; and
  - a second light source mounted in a second location on the printed circuit board;
- a transparent lens component comprising a first lens portion and a second lens portion; and
- an adjusting device for spatially adjusting the apparatus relative to a housing part of the rear view assembly, relative to at least one of a housing cap or a mirror foot cover,
- wherein the housing and the lens component are formed as a two component moulded part so that the first lens portion is orientated to focus light from the first light source and the second lens portion is orientated to focus light from the second light source via an optical assembly comprising a logo element,
- the first lens portion is angled relative to a plane containing the PCB surface so that a distance from the first light source to an outer surface of the first lens portion is less than a distance from the second light source to an outer surface of the second lens portion, with, in use, the housing being mounted so that the first lens portion and the second lens portion are adjacent the at least one aperture in the side mirror housing, and
- the adjusting device comprises at least one first adjusting element being arranged at the apparatus or formed together with an apparatus housing, provides at least one translational degree of freedom along at least one shifting axis or at least one rotational degree of freedom around at least one rotational axis.

* * * * *